(12) United States Patent
Chu

(10) Patent No.: US 6,332,604 B1
(45) Date of Patent: Dec. 25, 2001

(54) CLAMPING AND POSITIONING MECHANISM FOR THE INCLINED AXIS OF TWO-AXES ROTARY TABLES

(75) Inventor: Chih-Yaung Chu, Taipei (TW)

(73) Assignee: Fair Friend Enterprise Co., Ltd., Taipei (TW)

( * ) Notice: Subject to any disclaimer, the term of this patent is extended or adjusted under 35 U.S.C. 154(b) by 0 days.

(21) Appl. No.: 09/637,354

(22) Filed: Aug. 15, 2000

(51) Int. Cl.$^7$ .................................................. B23Q 1/25
(52) U.S. Cl. ............................... 269/71; 269/73; 269/27; 269/82
(58) Field of Search .................... 269/71, 73, 27, 269/43, 82, 83

(56) References Cited

U.S. PATENT DOCUMENTS

| | | | |
|---|---|---|---|
| 2,538,640 | * 1/1951 | Click | 269/43 |
| 3,700,228 | * 10/1972 | Peale | 269/71 |
| 4,844,431 | * 7/1989 | Camp et al. | 269/71 |
| 6,019,357 | * 2/2000 | Bartsch et al. | 269/43 |

* cited by examiner

Primary Examiner—Joseph J. Hail, III
Assistant Examiner—Lee Wilson
(74) Attorney, Agent, or Firm—Rosenberg, Klein & Lee

(57) ABSTRACT

Disclosed herein is a clamping and positioning mechanism for the inclined axis of two-axes rotary tables comprising an annular recessed slot formed along the outer surface of a stationary supporting frame. In this slot, there is installed a piston with a large cross sectional area and a plurality of connecting rods are in connection with the piston. These connecting rods are penetrated through corresponding plurality of respective through holes which are bored through the stationary supporting frame, and are extended until the surface of an axle bush of the inclined axis. There are plurality of double diameter holes opened on the axle bush so as to accept a plurality of double diameter brake members passing through those corresponding double diameter holes and screw combine with the extended ends of the connecting rods respectively. A spring is provided to regularly and elastically pressing against the piston such that the double diameter brake members are under relaxed position. As soon as an oil pressure is exerted from an oil pressure supply mechanism to actuate the piston, which in turn displaces each double diameter brake member to a braking position by way of the connecting rods, the axle bush of the inclined axis and the stationary supporting frame are thus forcibly pressed each other, and furthermore, the inclined axis together with the revolving axis sustained thereon is exactly positioned at a position with a predetermined inclination angle.

1 Claim, 3 Drawing Sheets

CLAMPING AND POSITIONING MECHANISM FOR THE INCLINED AXIS OF TWO-AXES ROTARY TABLES

BACKGROUND OF THE INVENTION

1. Field of the Invention

The present invention relates to clamping and positioning mechanism for the inclined axis of two-axes rotary tables.

2. Description of the Prior Art

Two-axes rotary table is machinery which utilizes a revolving arm installed on an inclined axis for supporting a work to be cut by machine spindle. The position of the inclined axis can be moved and settled at a proper location for facilitating the cutter to perform cutting or forming a curved surface on the work.

FIG. 3 shows a cross sectional view of a conventional two-axes rotary tables. As shown in FIG. 3 a layer of brake diaphragm 93 is formed at the contact surface 92 between the inclined axis 90 and a stationary supporting frame 91 for positioning the inclined axis at a position. There is oil pressure supply means 94 installed for providing pressurized oil for actuating the brake diaphragm 93 to press against the contact surface 92 thereby positioning the inclined axis 90 at a position of predetermined inclination angle. However, there are disadvantages inherent to such a brake diaphragm employed by the conventional art i.e.:

The inclined axis 90 together with its sustaining revolving arm is difficult to withstand a force for maintaining at its proper position for a required time due to insufficient pressure supplied by the brake diaphragm 93. As a result, the inclined axis 90 may be shifted from its proper position to cause affecting the working accuracy of the work table.

The brake diaphragm 93 might be deformed or even cracked after a period of time in use for a constant oil pressure exerted thereon. As a result, it not only affects the braking effect but also shortens the life of the brake diaphragm 93. It further increases cost of maintenance if a number of related components have to be detached and reassembled when a defected brake diaphragm 93 is to be replaced.

SUMMARY OF THE INVENTION

Therefore, the present invention has been made in order to eliminate the disadvantages inherent to the conventional technique as mentioned above.

It is an object of the present invention to provide clamping and positioning mechanism for the inclined axis of two-axes rotary tables having a strong braking strength sufficient to maintain the inclined axis and its sustaining revolving arm at a position of a predetermined inclination angle for a period of required time so as to obtain a reliable positioning effect and improve work accuracy.

It is another object of the present invention to provide clamping and positioning mechanism for the inclined axis of two-axes rotary tables able to prevent deformation or crack even after long time of use without affecting its braking effect thereby lengthening its lifetime and saving maintenance cost.

To achieve the above mentioned objects, there is provided a clamping and positioning mechanism comprising an annular recessed slot formed along the outer surface of a stationary supporting frame. In the annular recessed slot, there is installed a piston with a large cross sectional area and a plurality of connecting rods are in connection with the piston. The plurality of connecting, rods are penetrated through corresponding plurality of respective through holes which are bored through the stationary supporting frame, and are extended until the surface of an axle bush of the inclined axis. There are a plurality of double diameter holes opened on the axle bush so as to accept a plurality of double diameter brake members passing through those corresponding double diameter holes and screw combine with the extended ends of the connected rods respectively. A spring is provided to regularly and elastically pressing against the piston such that the double diameter brake members are under relaxed position. As soon as an oil pressure is exerted from a oil pressure supply means to actuate the piston, which in turn displaces each double diameter brake member to a braking position by means of the connecting rods, the axle bush of the inclined axis and the stationary supporting frame are thus forcibly pressed each other, and furthermore, the inclined axis together with the revolving axis sustained thereon is exactly positioned at a position with a predetermined inclination angle.

BRIEF DESCRIPTION OF THE DRAWINGS

The drawings disclose an illustrative embodiment of the present invention which serve to exemplify the various advantages and objects hereof, and are as follows.

DETAILED DESCRIPTION OF THE PREFERRED EMBODIMENT

Figure 1:
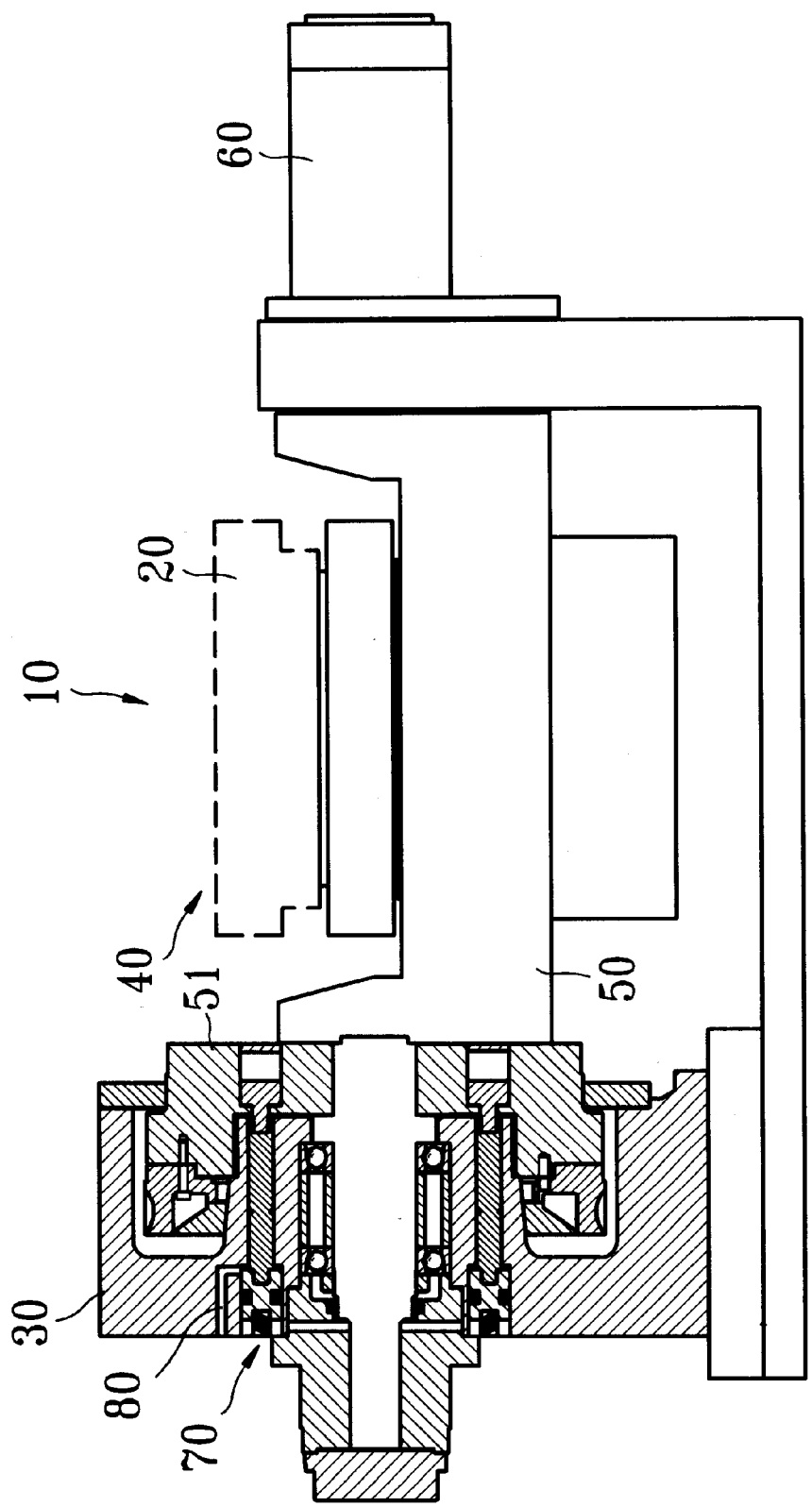
FIG. 1 is a cross sectional view showing two-axes rotary tables in the longitudinal direction according to the present invention.

As shown in FIG. 1, two-axes rotary tables 10 can revolve in various directions for shaping a work carried thereon into a curved surface. A revolving body 40 is mounted on a stationary supporting frame 30 of the work table 10. The revolving body 40 includes above mentioned revolving arm 20 and an inclined axis 50 which is used for installing the revolving arm 20 whereby a work to be cut is carried. The inclined axis 50 is sustained by an axle bush 51 which is engaged with the stationary supporting frame 30 and can be turned to a position with a predetermined inclination angle by a transmitting means 60 and is kept thereat for a predetermined time duration by clamping and positioning means 70.

An important improvement made to such two-axes rotary tables 10 described above by the present invention is that there is provided totally cross sectional type clamping and positioning means 70 for the inclined axis 50 instead of the conventional brake diaphragm so as to eliminate various disadvantages inherent to the conventional technique and reliably set the inclined axis at its position thereby improving working accuracy of the two-axes rotary tables 10.

Figure 2:
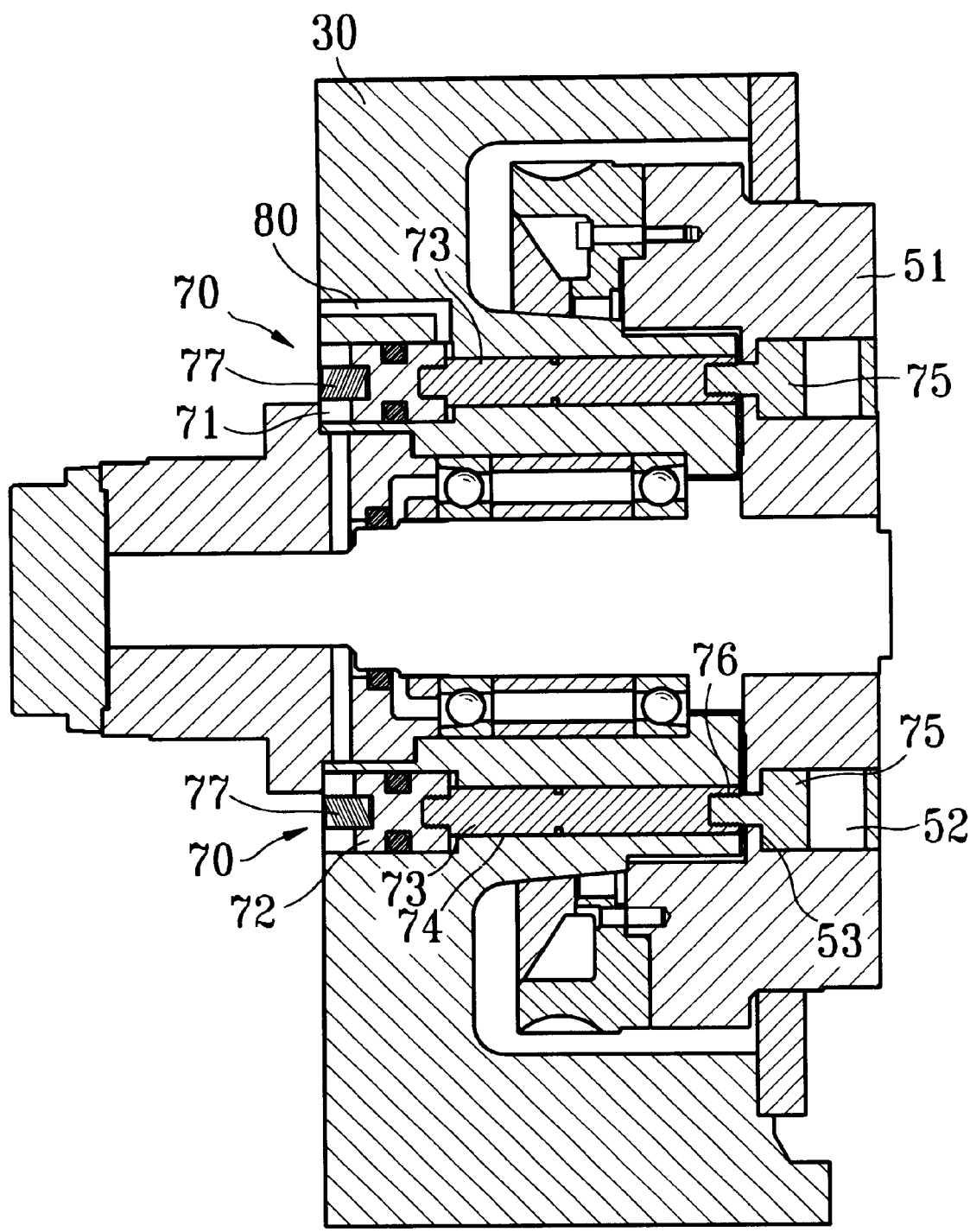
FIG. 2 is a cross sectional view showing two-axes rotary tables in which an inclined axis is tightly gripped by clamping and positioning means according to the present invention.
Figure 3:
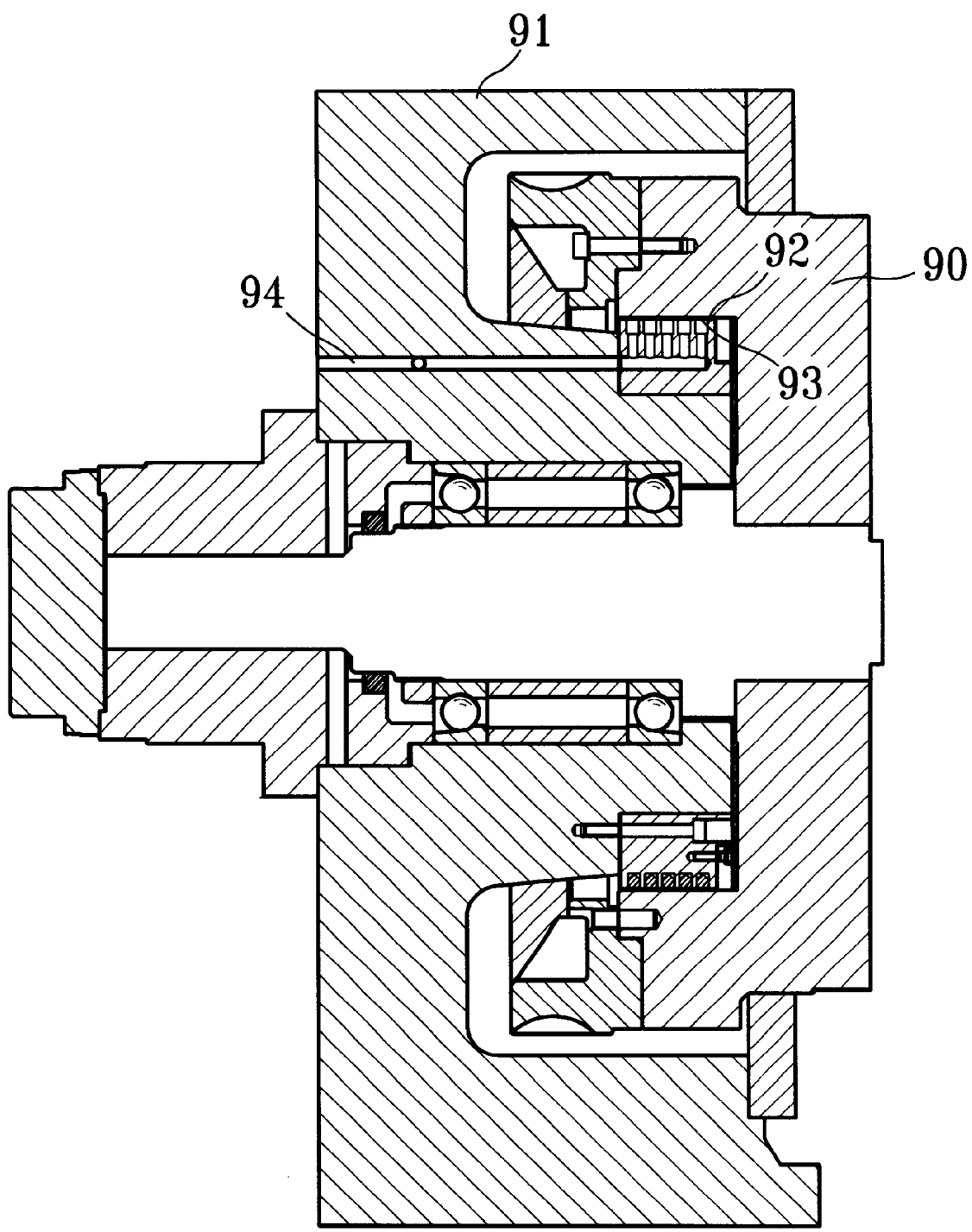
FIG. 3 is a cross sectional view of a brake diaphragm in a conventional two-axes rotary tables

FIG. 2 is a cross sectional view showing two-axes rotary tables in which the inclined axis is tightly gripped by clamping and positioning means of the present invention, as shown in FIG. 2, an annular recessed slot 71 is formed along the outer surface of the axle bush 51 facing the stationary supporting frame 30. A totally cross sectional piston 72 which being able to withstand an oil pressure and to reciprocate is installed in the annular recessed slot 71. This piston 72 is formed to have a large area and in connection with a plurality of connecting rods 73 which penetrate corresponding through holes 74 bored through the stationary supporting frame 30 and extend until an inner surface of the stationary supporting frame 30 facing the axle bush 51 respectively. There, are a plurality of approximately T shaped double diameter holes 52 bored through the axle bush 51 for respectively letting through corresponding double diameter brake members 75, and further respectively screw combining with the plurality of connecting rods 73 by means of threads provided on the smaller diameter porting 76 of the double diameter brake members 75.

In a normal state, the piston 72 is pressed by an elastic force of at least one spring 77 and stops at a relaxed position near the axle bush 51. At this time, each double diameter brake member 75 follows the piston 72 and is pushed away to a relaxed position without contacting the vertical end surface 53 of the double diameter hole 52 so that the axle bush 51 and the stationary supporting frame 30 are kept at an uncontacted state as usual. As a result, the inclined axis 50 driven by transmission means 60 may revolve freely. As soon as pressurized oil supplied by an oil pressure supply means 80 is introduced into the annular recessed slot 71 closed by the piston, the pressurized oil introduced actuate the piston 72 with an oil pressure so as to overcome the elastic force of the spring 77 and push the piton 72 away from the axle bush 51 to a brake position. Herein, each double diameter brake member 75 engaged with the corresponding connecting rod 73 follows the piston 72 to make a simultaneous displacement thereby tightly pressing against each corresponding vertical end surface 53 of the double diameter hole 52. Consequently, the axle bush 51 can tightly press on the inner surface of the stationary supporting frame 30. By means of the reaction force of the pressing force, it may be turned to a braking force to the axle bush 51 and the inclined axis 50 sustained by the former. As a result, the inclined axis 50 and the revolving arm 20 sustained thereon can be reliably positioned with a determined inclination angle.

As described above, the clamping and positioning mechanism provided by the present invention has various advantages compared to the product made according to the conventional technique. By employing a piston of large cross section which in turn carries a plurality of double diameter brake members to produce a packing function between the axle bush and the stationary supporting frame so that it is far more effective than a brake function provided by a conventional brake diaphragm. Moreover, various component parts such as the piston, double diameter brake members, the axle bush and the stationary supporting frame are all made of metallic materials so that they are strong enough to withstand long time use without occurrence of deformation or crack.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A clamping and positioning mechanism for the inclined axis of two-axes rotary tables, said work table having a revolving body mounted on a stationary supporting frame, said revolving body comprising a revolving arm on which a work is carried, and an inclined axis on which said revolving arm is mounted, said inclined axis being sustained by an axle bush which being tightly engaged to said stationary supporting frame, and can be turned to a position with a predetermined inclination angle by a transmission means, and held thereat by means of said clamping and positioning mechanism which comprising:

an annular recessed slot formed along the outer surface of said stationary supporting frame facing said axle bush;

a totally cross sectional piston installed in said annular recessed slot and normally located at a relaxed position away from said axle bush by an elastic force of a spring;

at least one connecting rod connected to said piston and extended to an inner surface of said stationary supporting frame facing to said axle bush;

at least one double diameter hole bored through said axle bush and having a vertical end surface;

at least one double diameter brake member passing through said double diameter hole and being connected to said connecting rod; and an oil pressure supply means capable of removing said piston from said relaxed position to a braking position, said piston being displaced to said braking position simultaneously carrying said double diameter brake member to forcibly press against said vertical end surface of the double diameter hole so as to make said axle bush further tightly pressing on said stationary supporting frame thereby positioning said inclined axis at a position with a predetermined inclination angle.

* * * * *